US008239357B1

(12) United States Patent
Kirkpatrick et al.

(10) Patent No.: US 8,239,357 B1
(45) Date of Patent: Aug. 7, 2012

(54) METHOD AND SYSTEM FOR EXTRACTING INFORMATION FROM ELECTRONIC DATA SOURCES

(75) Inventors: Timothy Michael Kirkpatrick, Cypress, TX (US); Kyle Day Meredith, Spring, TX (US)

(73) Assignee: Ryan, LLC, Dallas, TX (US)

( * ) Notice: Subject to any disclaimer, the term of this patent is extended or adjusted under 35 U.S.C. 154(b) by 296 days.

(21) Appl. No.: 12/557,717

(22) Filed: Sep. 11, 2009

Related U.S. Application Data

(60) Provisional application No. 61/096,643, filed on Sep. 12, 2008.

(51) Int. Cl.
*G06F 7/00* (2006.01)
*G06F 17/30* (2006.01)

(52) U.S. Cl. ............... 707/705; 707/805; 707/E17.005; 707/E17.014; 715/206; 715/700

(58) Field of Classification Search ............... 707/705, 707/726, 805, E17.005, E17.014; 715/206, 715/700
See application file for complete search history.

(56) References Cited

U.S. PATENT DOCUMENTS

| | | | |
|---|---|---|---|
| 6,249,773 B1* | 6/2001 | Allard et al. ............... | 705/26.8 |
| 6,988,241 B1* | 1/2006 | Guttman et al. ............ | 707/E17.115 |
| 2003/0208639 A1* | 11/2003 | Stern et al. ............... | 709/329 |
| 2005/0267868 A1* | 12/2005 | Liebl et al. ............... | 707/2 |
| 2005/0270063 A1* | 12/2005 | Cornett ..................... | 326/39 |
| 2005/0289149 A1* | 12/2005 | Carro ....................... | 707/10 |
| 2006/0085742 A1* | 4/2006 | Harold et al. ............. | 715/700 |
| 2007/0192329 A1* | 8/2007 | Croft et al. ............... | 707/10 |
| 2007/0282951 A1* | 12/2007 | Selimis et al. ............ | 709/205 |
| 2008/0016472 A1* | 1/2008 | Rohlf et al. ............... | 715/848 |
| 2008/0071820 A1* | 3/2008 | Mori et al. ................ | 707/102 |
| 2008/0086450 A1* | 4/2008 | Bittenson .................. | 707/3 |
| 2009/0006393 A1* | 1/2009 | Nurmi ...................... | 707/6 |

OTHER PUBLICATIONS

Arthur M. Langer—"XML, in Analysis and Design"—Analysis and Design of Information Systems, 2008 (pp. 176-205) (SpringerLink).*
"ARN Supply Chain Management System for OCIE" Apparel Research Network (ARN) Program—AdvanTech, Inc Dec. 30, 2006 (pp. 1-51).*

* cited by examiner

*Primary Examiner* — Anh Ly
(74) *Attorney, Agent, or Firm* — Craig J. Cox; Bell Nunnally & Martin LLP

(57) ABSTRACT

A system and method of extracting information from electronic data sources that includes generating a list of file names containing the information to be extracted. Each file name in the list is read into memory, the file that corresponds to the file name is read into memory, and the information is extracted from the file by executing a series of programming instructions. The information is saved to an extracted file, and one or more file names in the list is identified to correspond to an extracted file.

18 Claims, 9 Drawing Sheets

METHOD AND SYSTEM FOR EXTRACTING INFORMATION FROM ELECTRONIC DATA SOURCES

RELATED PROVISIONAL PATENT APPLICATION

This application claims priority to U.S. Provisional Patent Application Ser. No. 61/096,643, filed Sep. 12, 2008, entitled Method and System for Extracting Information from Electronic Data Sources, the entirety of which is hereby incorporated by reference.

BACKGROUND

The present invention relates to information extraction from electronic data sources and more particularly to systems and methods that extract information from electronic data sources maintained in a variety of different configurations and formats.

With the advent of digital technology and electronic commerce, there is a growing need to process and mine the data contained in an enterprise's database of electronic documents and forms. Electronic document management is often limited to mining techniques that are specific to the format of the data source and specific to a certain document layout. However, there can be hundreds of different basic types of documents in differing formats stored in data sources maintained by a large enterprise. There exists a need for a system of managing and searching these documents in an efficient and cost-effective manner.

DETAILED DESCRIPTION

This disclosure relates generally to computer software and, more specifically, to a system and method for extracting data from electronic document sources. The elements that implement the various embodiments of the present system and method are described below, in some cases at an architectural level. Many of these elements may be configured using well-known structures. For example, the present system and method may be executed on a single computer, local area networks, client-server networks, wide area networks, internets, hand-held or other portable and wireless devices and networks.

The data processing described below may be performed by a single platform or by a distributed processing platform. In addition, such processing and functionality may be implemented in the form of special purpose hardware or in the form of software or firmware being run by a general-purpose or network processor. Data handled in such processing or created as a result of such processing can be stored in any type of memory as is conventional in the art. By way of example, such data may be stored in temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable medium may comprise any form of data storage mechanism, including existing memory technologies as well as hardware or circuit representations of such mechanism and of such data.

It should also be understood that the techniques of the present system and method might be implemented using a variety of technologies. For example, the methods described herein may be implemented in software running on a programmable microprocessor, or implemented in hardware utilizing either a combination of microprocessors or other specially designed application, specific integrated circuits, programmable logic devices, or various combinations thereof. In particular, the methods described herein may be implemented by a series of computer-executable instructions residing on a storage medium such as a disk drive or other computer-readable medium. A computer-readable medium can be an electronic, magnetic or optical device. Examples of a computer-readable medium include solid state memory, magnetic tapes, random access memory, read-only memory, magnetic computer disks and optical computer disks.

Figure 1:
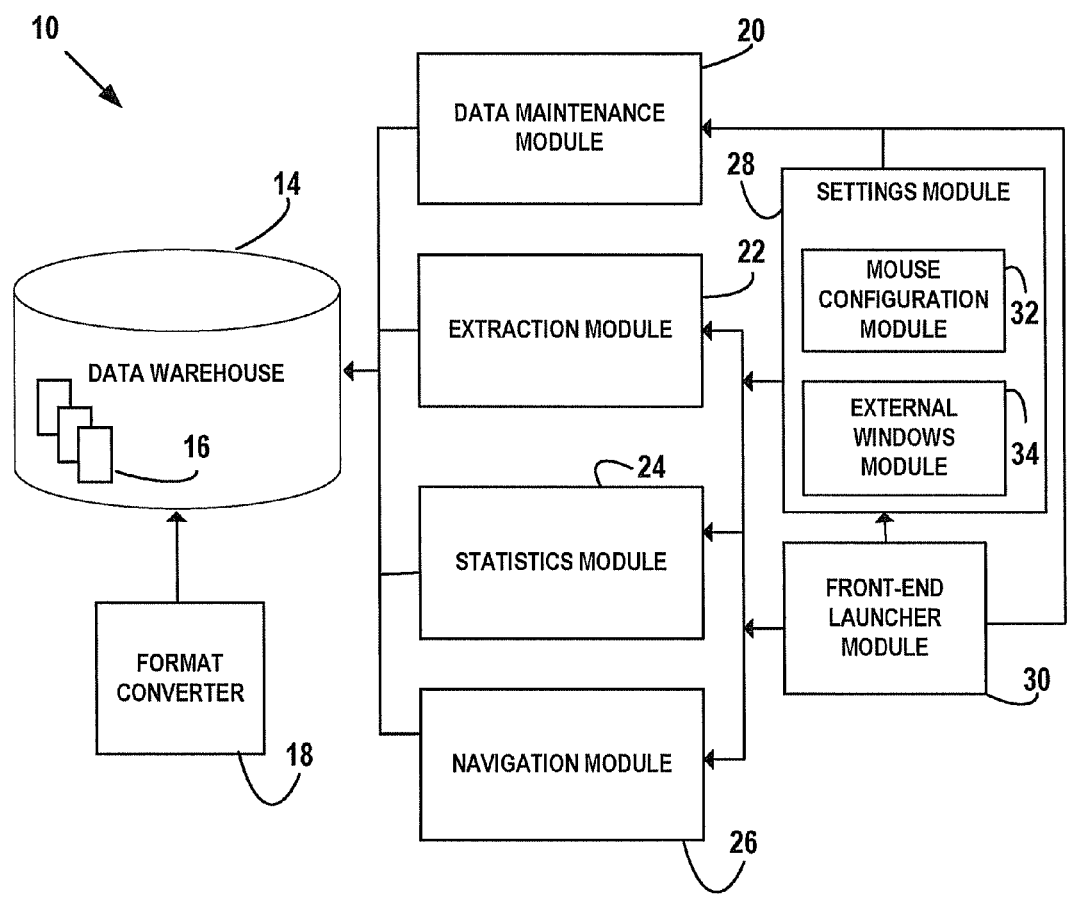
FIG. 1 is a diagrammatic illustration of a system according to an exemplary embodiment of the present invention.

FIG. 1 illustrates an exemplary embodiment of an automatic data extraction system 10, which comprises data warehouse 14, format converter 18, front-end launcher module 30, extraction module 22, data maintenance module 20, statistics module 24, navigation module 26 and settings module 28. Data warehouse 14 stores electronic documents 16. In an exemplary embodiment, the data warehouse 14 is a repository of an enterprise's electronically stored documents 16. The data warehouse 14 may be designed to facilitate reporting and analysis of the stored documents 16 and may also be used to perform daily transaction processing. The data warehouse 14 may store the documents 16 with a common data model, or multiple data models, depending on the documents' 16 source. Typical unstructured data sources that may be stored as documents 16 in the data warehouse 14 include web pages, emails, financial documents, scanned text, and reports.

The documents 16 contain electronic media content, or data, that is intended to be used in either in electronic form or as printed output. Documents 16 may be originally created as electronic documents by scanning paper-based documents, by screen scraping, or any combination of some or all of the foregoing.

The documents 16 can encompass a large number of relevant data in certain locations within the document. Data is anything in a form suitable for use with a computer. In one embodiment, the documents 16 contain various data such as revenue, identification numbers, dates and the like. In one embodiment, the documents 16 include financial information, such as tax and audit information. In one embodiment, these various data are contained in tax-related documents stored electronically in a variety of data formats and layouts.

In an exemplary embodiment, a format converter 18 is used to convert the file format of the documents 16 stored in the data warehouse 14 into a single selected file format, such as a portable document format (PDF). A file format is a particular way to encode information for storage in a computer file. Some file formats are designed to store particular sorts of data: the PDF format, for example, is designed to store two-dimensional documents in a manner independent of the application software.

The front-end launcher module 30 provide a graphical user interface to launch one or multiple document extraction procedures in the extraction module 22, to launch the data maintenance utilities in the data maintenance module 20, to display data extraction statistics from the statistics module 24, and to display navigation module 26.

In an exemplary embodiment, the extraction module 22 launches a data extraction utility. In an exemplary embodiment, this launch is accompanied by a confirmation prompt and a ten second delay. Data extraction is the process of retrieving data from the documents 16 or other data out of unstructured or badly structured data sources for further processing.

Some embodiments of the extraction module 22 contain multiple extraction procedures inside of a single extraction utility. In an exemplary embodiment, the extraction module 22 contains one or two extraction procedures inside a single extraction utility. In another embodiment, the extraction module 22 contains three, four, or five extraction procedures inside a single extraction utility. Additional extraction procedures serve to extract the desired document data by different customized methods, depending on the location and format of the document. These additional extraction procedures also serve to extract desired document data if an initial extraction procedure in unsuccessful.

In an exemplary embodiment, the data extraction system 10 also includes a data maintenance module 20 that organizes the documents 16 and maintains the data stored in the documents 16. Data maintenance may include adding, deleting, changing and updating of data within the documents 16.

The statistics module 24 monitors and maintains statistical values associated with extraction of data from the documents 16. In an exemplary embodiment, the statistics module 24 generates an output by automatically manipulating cells in an electronic spreadsheet based on certain returned information from the extraction module 22. The statistics module 24 may re-calculate numbers automatically every time the statistics module 24, or another module, makes a change to a cell on the spreadsheet.

The navigation module 26 manipulates the user interfaces of one or more of the other modules, and saves changes made by the other modules to the spreadsheet, and returns the operator to the spreadsheet upon closure of the automation data extraction system 10. User interfaces consist of any list of options or commands presented to an operator of the automation data extraction system 10. Options displayed on a user interface may be selected by the operator by a number of methods, such as depressing one or more keys on the keyboard or mouse, positioning a cursor or by using a keyboard or mouse, touching the display screen with a finger, or speaking to a voice-recognition system.

The settings module 28 is accessed through the front-end launcher module 30 and provides another graphical user interface in communication with the data maintenance module 20, the extraction module 22, the statistics module 24, and navigation module 26. The settings module 28 customizes various aspects of other modules, such as file save locations in the extraction module 22.

In an exemplary embodiment, the settings module 22 contains a mouse configuration module 32 and an external windows module 34. The mouse configuration module 32 is used to store mouse movement cursor positions, which are then used by the extraction module 22 via a programmatic implementation. In an exemplary embodiment, the operator configures the cursor movement events that are desired for a subsequent extraction procedure. The external windows module 34 is used to store placeholders for external windows. These placeholders are tied into programmatic actions by the extraction module 22 to resize, relocate, or anchor external windows. In this way, the external windows module 34 ensures that cursor movements land on the intended control during a subsequent extraction procedure.

Figure 2:
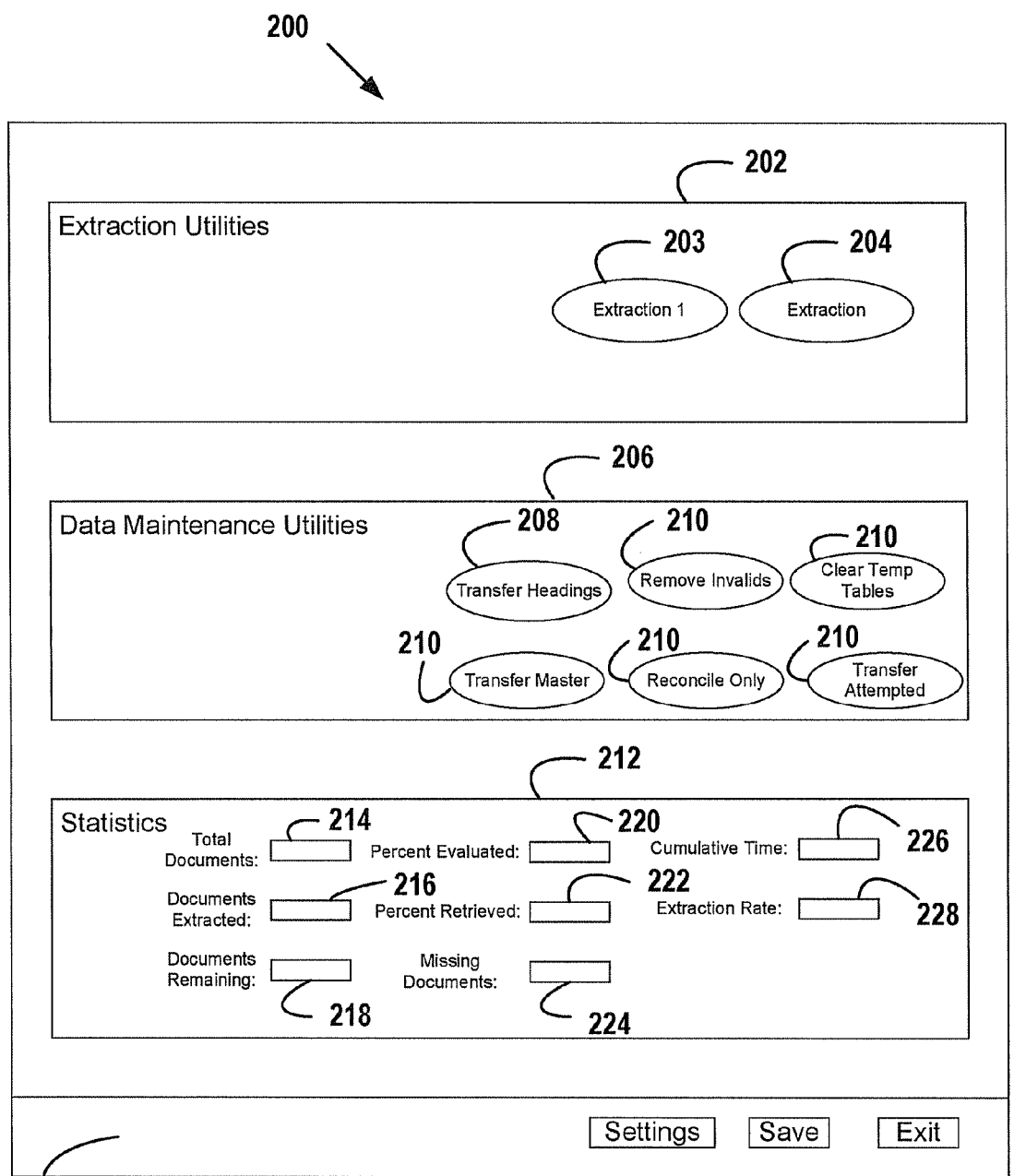
FIG. 2 is a screenshot of an exemplary embodiment of the present invention.

Referring now to FIG. 2, an exemplary screenshot 200 for the front-end launcher module 30 is shown. The front-end launcher module 30 contains graphical user interface 202 designed to launch the extraction module 22. Button 204 launches the extraction module 22.

The front-end launcher module 30 also contains graphical user interface 206 to launch certain functions associated with the data maintenance module 20. Button 208 and/or button 210 launch one or more such data maintenance functions, such as transferring spreadsheet headings to another spreadsheet, clearing temporary spreadsheet tables, transferring the master list to another spreadsheet, and transferring the attempted list to another spreadsheet.

The front-end launcher module 30 also contains graphical user interface 212, which displays the following information from the statistics module 24: the total number of records available on the master list 214, the total number of records on the extracted list 216, the total number of records on the pull list and the attempted list (representing all potentially available un-extracted documents) 218, the percentage of records on which an extraction has been attempted (sum of extracted list, attempted list and not available list records divided by master list record count) 220, the percentage of records ascertained (sum of extracted list records divided by the master list records) 222, the total record count on the not available list 224, the total time (in hours) the extraction utility has been in the process of extracting documents associated with records on the master list 226, and the number of extraction procedures performed per hour of the life of the extraction utility 228. In an exemplary embodiment, this information is presented in non-editable text boxes.

Figure 3A:
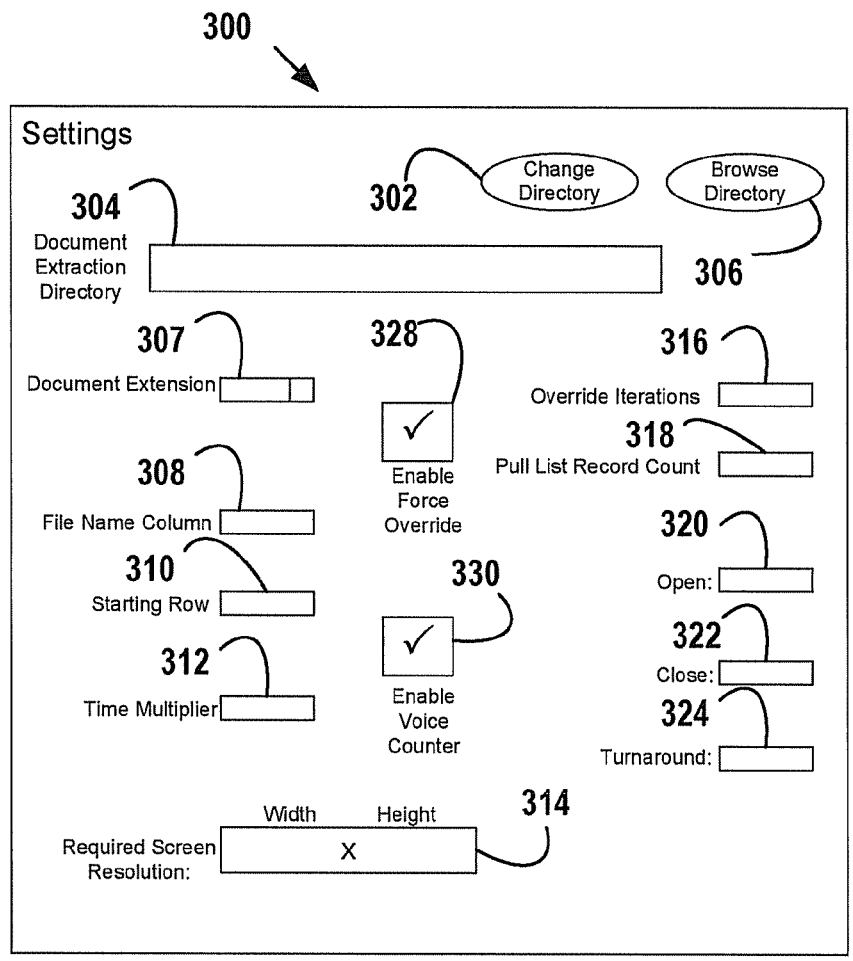
FIG. 3A is a screenshot of an exemplary embodiment of the present invention.

Referring now to FIG. 3A, an exemplary screenshot 300 of the graphical user interface for the settings module 28 is shown. In one embodiment, the settings module 28 contains a browse directory button 302 that executes a windows scripting object that opens a browse window to the current document extraction directory. The browse window allows the operator to create new folders, copy folders, create shortcuts, and delete folders, and is designed for the operator to choose the target extraction directory that the extracted data will be saved to. Once a directory is highlighted and a button is clicked, the full directory path is populated in non-editable text box 304. If the extraction directory is not defined, the local root directory is used as the default directory.

Figure 3B:
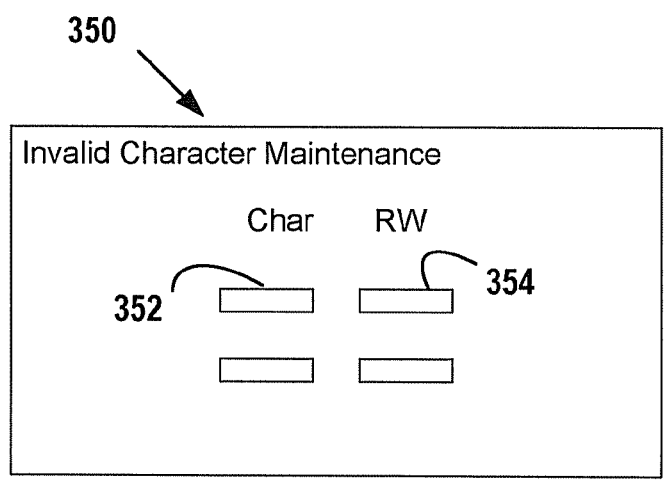
FIG. 3B is a screenshot of an exemplary embodiment of the present invention.

The settings module 28 contains button 306 that opens an invalid character maintenance screen 350 in the data maintenance module 20, as illustrated in FIG. 3B.

A drop-down box 307 in the settings module 28 stores one or more file name extensions. A file name extension is a suffix to the name of a computer file that indicates the format of the file's contents. Only those documents 16 in the extraction directory with a file name extension matching drop-down box 307 will be subject to the extraction utility.

As shown in screenshot 300, in an exemplary embodiment, the settings module 28 contains extraction options, which include a user-editable text box 308 that designates the pull list column on the active spreadsheet from which the extraction utility reads each file name. A user-editable text box is an element of graphical user interface of computer programs that allows the operator to input text information to be used by the program. Both uppercase and lowercase values are accepted in the text box 308. The extraction options also include a user-editable text box 310 that designates the starting row for the records on the active electronic spreadsheet. The extraction options also include a force override check box 328 that allows the operator to toggle between having the extraction procedure run until an attempt has been made to extract data for each record available on the pull list, or, until a predefined number of extraction iterations have occurred. The check box 328, when toggled on, sets the predefined number of iterations; the check box 328, when toggled off, causes the extraction procedure to run once on each record until the pull list availability has been exhausted. If the force override check box is toggled on 328, the extraction options also include a user-editable text box 316 that defines the number of iterations to run the extraction procedure. The extraction options also include a non-editable text box 318 that displays the total number of records available on the pull list.

As shown in screenshot 300, in an exemplary embodiment, the settings module 28 also contains time options that include a user-editable text box 312 that designates the numerical value by which to multiply wait times in the extraction module 22. "1" is the default value, and causes the extraction procedure to run at normal speed; "2" causes the extraction module 22 to run twice as slow, and "0.5" causes the extraction module 22 to run twice as fast. The time options also include a user-editable text box 320 that stores a numerical value that governs the speed of the open file procedure of the extraction module 22. The time options also include a user-editable text box 322 that stores a numerical value that governs the speed to the close file procedure of the extraction module 22. The time options also include a user-editable text box 324 that stores a numerical value that governs the turn-around time for procedures within the extraction module 22.

As shown in screenshot 300, in an exemplary embodiment, the settings module 28 also contains a voice counter check box 330 that, when checked, will create a reoccurring audible indicator during an extraction procedure that reflects the progress of the extraction procedure.

As shown in screenshot 300, in an exemplary embodiment, the settings module 28 also contains general options that include a user-editable text box 314 that stores numerical values governing the required screen resolution of the computer hosting the extraction module 22. The screen resolution of a computer refers to the number of distinct pixels in the horizontal and vertical dimensions that can be displayed to the operator.

Referring now to FIG. 3B, an exemplary screenshot for the invalid character maintenance screen 350 stores and accepts entry of invalid file name characters in user-editable text box 352 and text objects to replace invalid characters in the file names of the files in the extraction directory in user-editable text box 354. Blank entries in the user-editable text box 354 are treated as " " (empty set). For example, the invalid file name character "$" in user-editable text box 352 under a Char column can be replaced with the text object " " under the RW column. In an exemplary embodiment, the settings module 28 writes the invalid file name characters and the text objects to a settings segment of a spreadsheet hidden from the operator. An exit button closes the invalid character maintenance screen 304 and returns the operator to the front end launcher module 30.

Figure 4A:
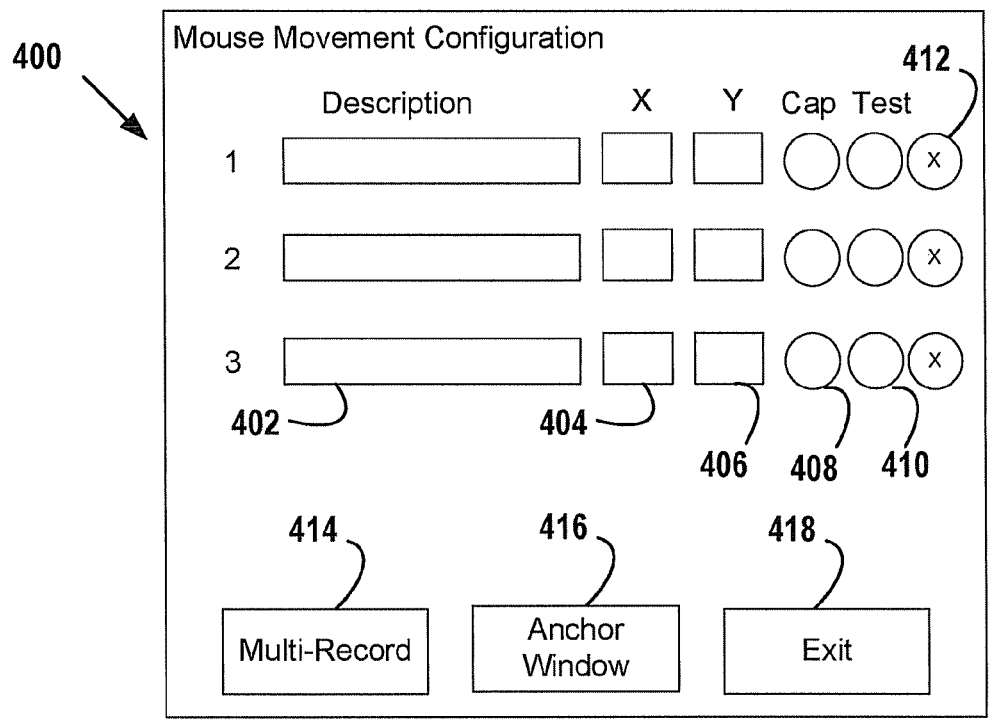
FIG. 4A is a screenshot of an exemplary embodiment of the present invention.

Referring now to FIG. 4A, an exemplary screenshot 400 of the graphical user interface for the mouse configuration module 32 is shown. A user-editable text box 402 contains a user-defined label of the corresponding mouse movement for the row. A user-editable text box 404 contains the X-coordinate, or horizontal coordinate, of where on the screen the cursor will be relocated. A user-editable text box 406 contains the Y-coordinate, or vertical coordinate, of where on the screen the cursor will be relocated. A capture button 408 allows the user to retrieve the coordinates of the cursor's then-current position by pressing a pre-assigned key on the keyboard. A test button 410 moves the cursor to the X and Y-coordinates corresponding to the text box 404 and the text box 406 after a user-defined delay. A clear button 412 clears the text box 402, text box 404, and text box 406 from the corresponding row. A multi-record button 414 allows the operator to record multiple X and Y-coordinates, beginning with the first blank text box on the graphical user interface by pressing a pre-assigned key on the keyboard multiple times. An anchor window button 416 sets an external window to a pre-defined set of screen coordinates. An exit button 418 closes the mouse configuration module 32 and returns the operator to the settings module 28.

Figure 4B:
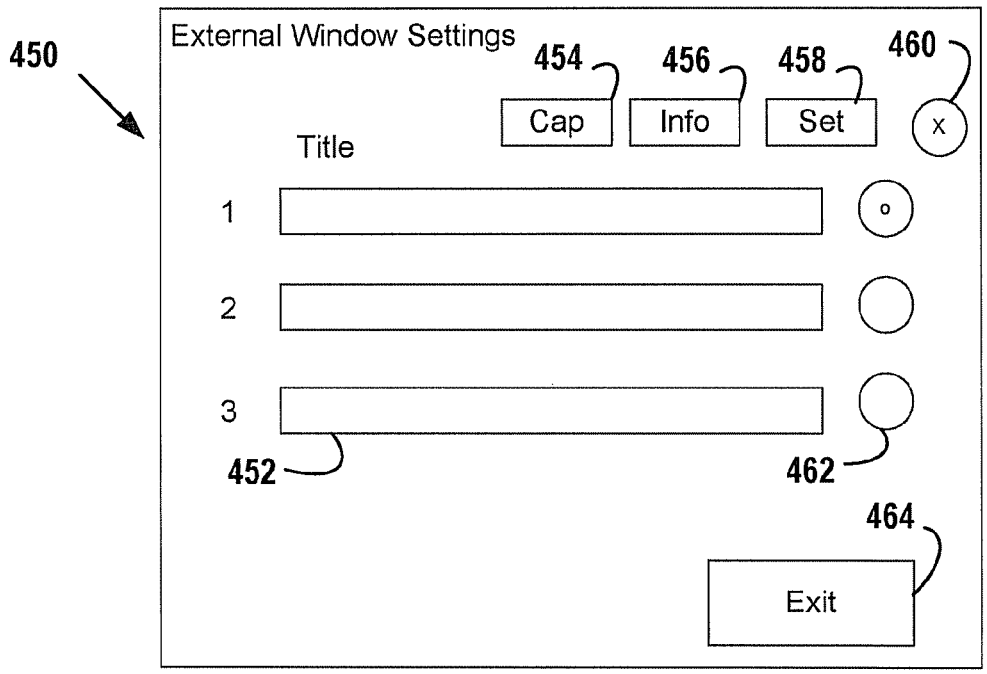
FIG. 4B is a screenshot of an exemplary embodiment of the present invention.

Referring now to FIG. 4B, an exemplary screenshot 450 of the graphical user interface for the external windows module 34 is shown. The external windows module 34 is accessible through the settings module 28. A user-editable text box 452 contains a user-defined label for each placeholder. These labels uniquely identify a particular window via an exact string match between the text box 452 and the window caption of an external window during the extraction procedure. A cap button 454 retrieves various identifying data regarding the targeted external window and writes the data back to the placeholder corresponding to the user-selected option box 462. The following identifying data are retrieved by the cap button 454: caption of the window, height in pixels of the window, width in pixels of the window, top left hand corner X-coordinate or horizontal pixel coordinate, top left hand corner Y-coordinate or vertical pixel coordinate. An info button 456 retrieves the above listed data stored in the placeholder corresponding to the user-selected option box 462 and displays it in the form of a message box to the operator. A set button 458 resizes and relocates the external window corresponding to the user-selected option box 462 according to the data stored in the placeholder. An X button 460 clears the placeholder data according to the user-selected option box 462. An exit button 464 closes the external windows module 34 and returns the operator to the settings module 28.

Figure 5A:
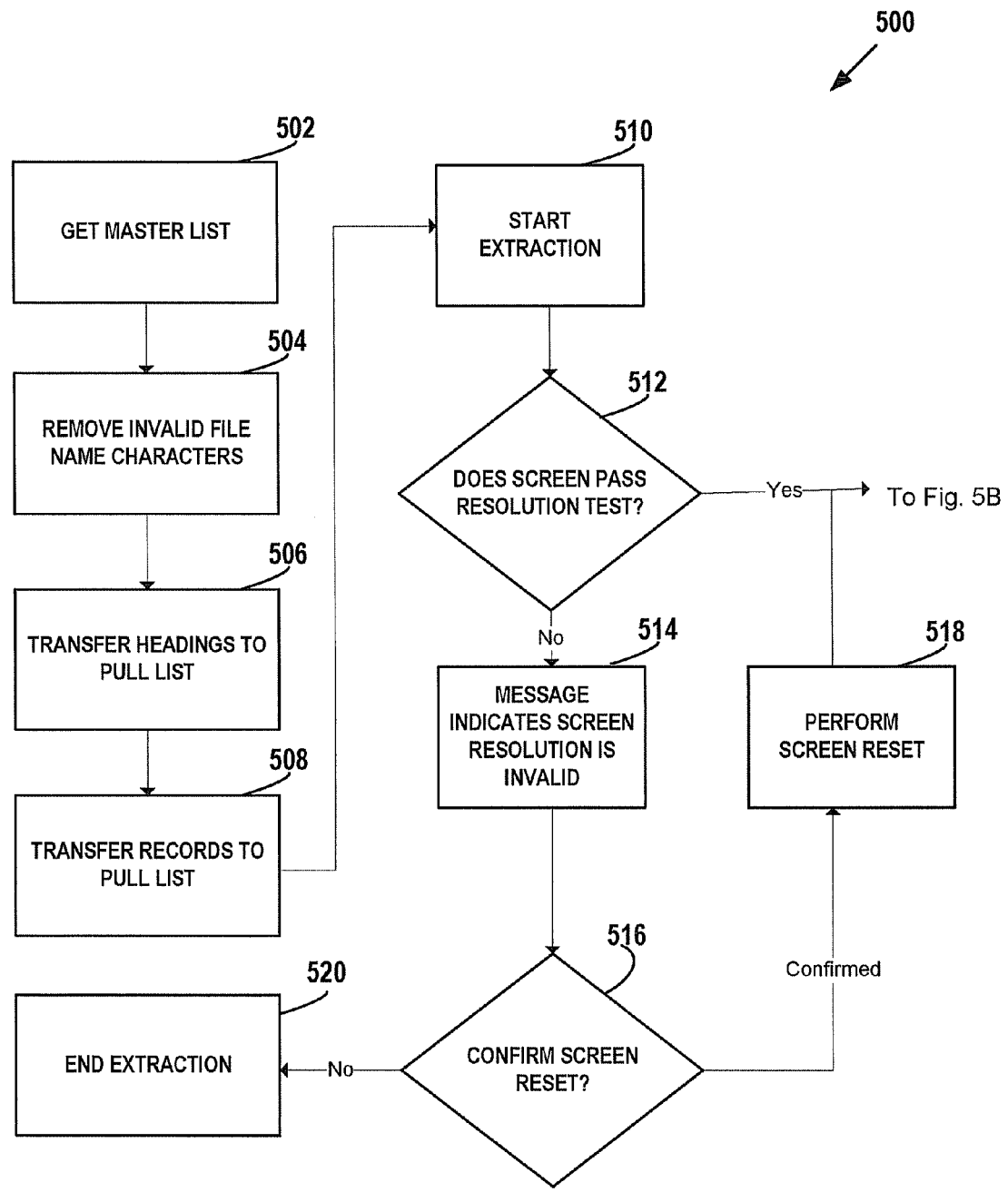
FIG. 5A is a flowchart illustration of a method of operation of an exemplary embodiment of the present invention.

In FIG. 5A, a flowchart of a method of operation 500 of the extraction module 22 is illustratively shown in accordance with one embodiment. At step 502, a master list of records containing user-defined parameters to be used in the extraction procedure is generated. The master list may be generated by any method capable of creating and storing an electronic list. In an exemplary embodiment, the master list is stored in an electronic spreadsheet. An electronic spreadsheet is a computer application that simulates a paper worksheet. A spreadsheet displays multiple cells that together make up a grid consisting of rows and columns, each cell containing either alphanumeric text or numeric values. A spreadsheet cell may alternatively contain a formula that defines how the contents of that cell is to be calculated from the contents of any other cell (or combination of cells) each time that cell is updated.

At step 504, default and user-defined invalid filename characters are removed from the filename column in the master list. A filename is a special kind of string used to identify a file stored on the file system of a computer. A filename character is deemed invalid if it is not compatible with the application used later in the process flow 500 to copy a file to the extraction directory. Removal of default and user-defined invalid filename characters may be performed because different operating systems impose different restrictions on length and allowed characters for filenames. At step 506, the headings from the master list are copied from the master list and pasted to the pull list. At step 508, records beginning with a user-defined starting row to the last non-blank row are copied from the master list and pasted to the pull list, and the pull list is read into memory. In an exemplary embodiment, the data maintenance module 20 transfers all of the records above a user-defined starting row from the master list to the pull list.

At step 510, the extraction procedure starts. At step 512, a screen resolution test is performed. If the screen resolution does not match certain requirements, based on compatibility with the application used later in the process flow 500 to copy a file to the extraction directory, the extraction procedure moves to step 514. If the screen resolution meets the requirements, the process flow 500 moves to step 522.

At step 514, a message box is displayed to the operator indicating that the screen resolution is invalid. At step 516, an option box is presented to the operator to confirm a screen reset. If the operator confirms a screen reset, the screen resolution of the operator's operating system is changed to a setting meeting the resolution requirements in the step 518. If the operator declines a screen reset, the extraction system proceeds to step 520. At step 520, the process flow 500 ends.

Figure 5B:
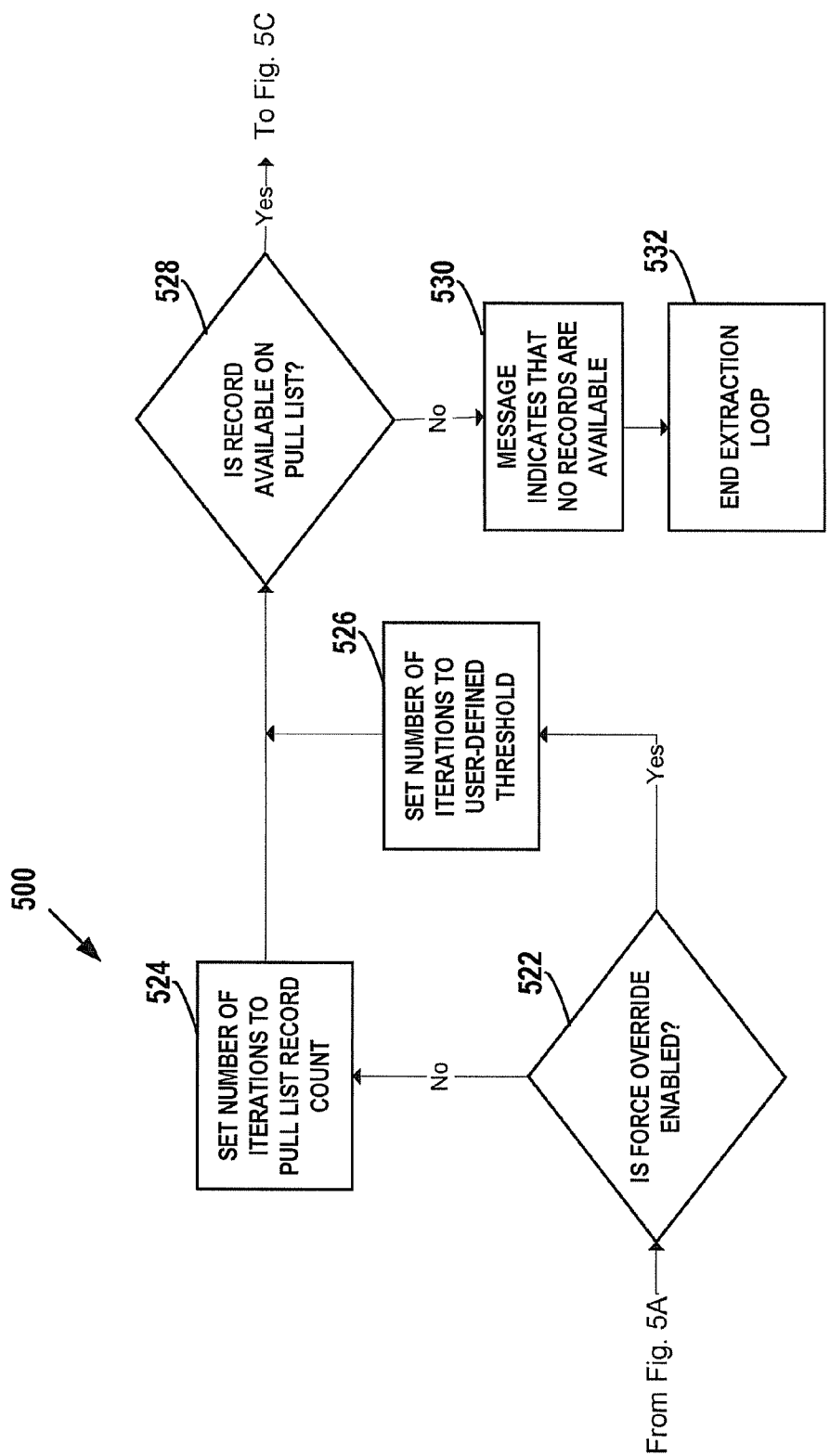
FIG. 5B is a flowchart illustration of a method of operation of an exemplary embodiment of the present invention.

Turning now to FIG. 5B, at step 522, the user-defined force override setting is queried. If the operator has enabled a custom threshold for iterations through the force override setting, the procedure moves to step 526. If the operator has not enabled the force override setting, the procedure moves to step 524.

At step 524, the iterations (the number of times the customized extraction loop will be performed on the current record) are set to the total record count on the pull list. At step 526, the iterations (the number of times the customized extraction loop will be performed) are set to the user-defined threshold.

At step 528, the pull list is checked for the existence of a record. In an exemplary embodiment, the records on the pull list have been imported from the master list previously. If there are no records on the pull list, the process flow 500 proceeds to step 530. If there are records on the pull list, the method proceeds to the screen resolution test at step 534.

At step 530, a message box is displayed to the operator indicating that no records are available to extract. At step 532, the process flow 500 ends.

Figure 5C:
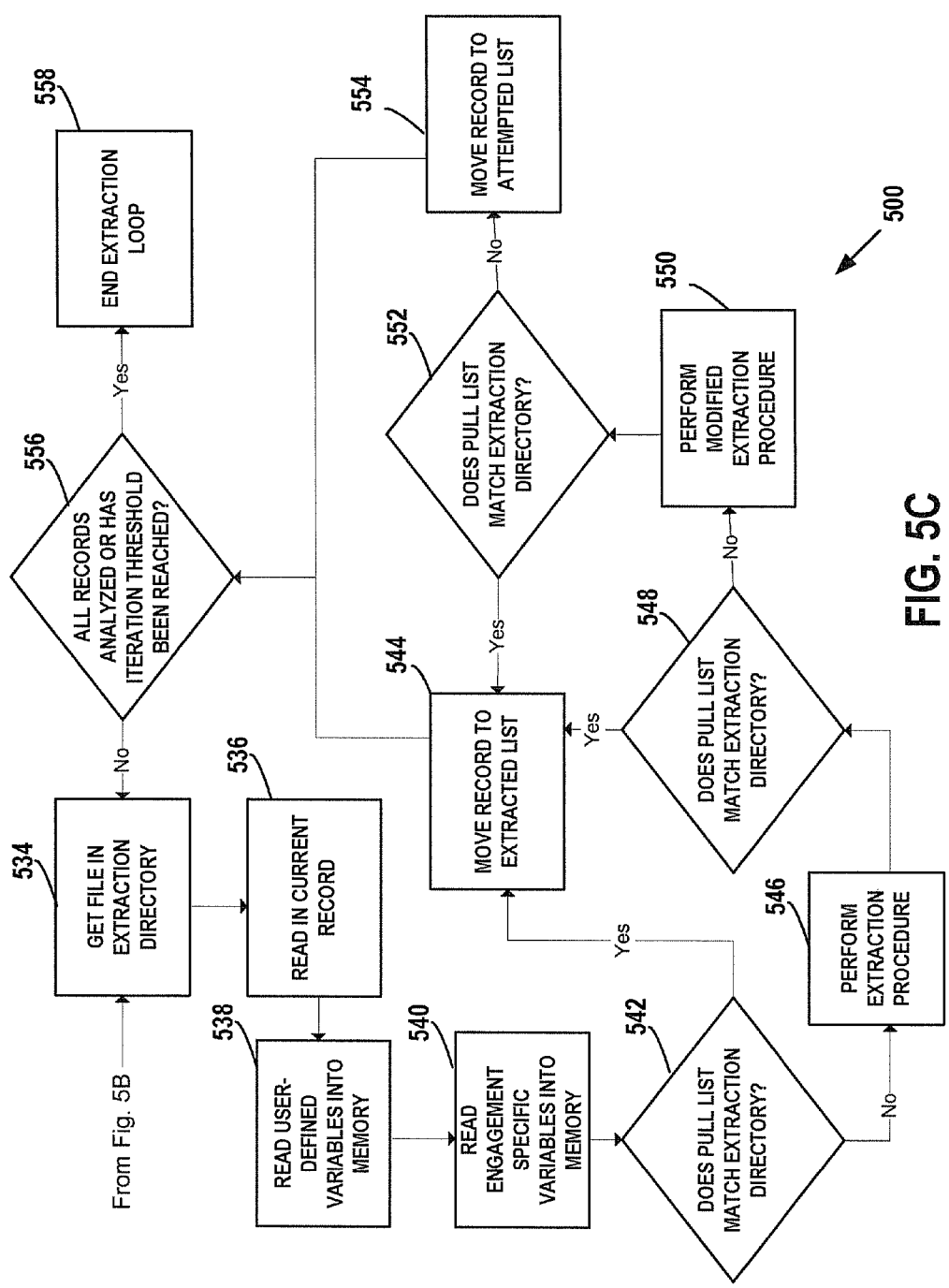
FIG. 5C is a flowchart illustration of a method of operation of an exemplary embodiment of the present invention.

Turning now to FIG. 5C, at step 534, the documents 16 in the extraction directory are retrieved and read into memory. At step 536, a record contained in a row on the pull list is read into memory. Also at the step 536, certain parameters from the current record are compiled into variables by the computer hosting the extraction module 22. In one embodiment, the variables are variables in a BASIC programming language. At step 538, user-defined variables that have been defined in the Settings Module 28, such as the document extension, starting row, and time multiplier are read into memory. In an exemplary embodiment, these user-defined variables are read into memory as BASIC variables. These variables govern the behavior of the extraction procedure. At step 540, specific engagement variables, as defined within the extraction module 22, are read into memory.

At step 542, the filename on the pull list is compared with the corresponding filename in the extraction directory. Specifically, this evaluation compares the filename obtained from the file name column in the pull list against the name of the document in the extraction directory. At step 544, if a match is found, the record associated with the matching filename in the pull list is moved to the extracted list.

An extraction procedure is initiated at step 546. This custom extraction procedure may vary dramatically depending on the imaging system, host computer, network speed, screen resolution, and target document availability. The variables compiled in the step 538 are used by the custom extraction loop to extract data from targeted documents 16 stored in the data warehouse 14 and save this data to the extraction directory as a file with the same name as the file name in the file name column of the current record.

At step 548, if the data associated with the current record is successfully extracted, the extraction utility moves to step 544. A successful extraction occurs if the custom extraction procedure results in a file saved in the extraction directory, as defined by the operator in the settings module 28, that has an identical file name to the file name in the column associated with the current record on the pull list. If the extraction procedure does not result in extracted data and a saved file in the extraction directory, the extraction utility moves to step 550.

In an exemplary embodiment, the document associated with the current record then goes through a modified extraction procedure at step 550. In one embodiment, the modified extraction procedure at the step 550 may be initiated with modifications to the parameters used in the extraction procedure at the step 546. At step 552, if the modified extraction procedure is not successful at extracting the data associated with the current record and saving a file in the user-defined extraction directory as determined at the step 550, the record associated with the non-matching filename in the pull list is moved to the attempted list at the step 554.

In one embodiment, unsuccessful extraction occurs when there is no data in one of the documents 16 matching the parameters of the current record in the pull list. Other causes of unsuccessful extraction include unusually large document sizes and premature disconnection from the data warehouse 14 during the custom extraction procedure.

At step 544, after a successful extraction, the current record is moved from the pull list to the first non-blank row (user-defined start row or greater) on the extracted list. At step 556, it is determined whether or not all records on the pull list have been read into memory and subjected to an extraction procedure. If at the step 556, it is determined that there are additional records on the pull list, the extraction procedure will then return to step 534 and begin again by reading the next record on the pull list into memory.

Also at step 556, a test is performed to determine whether the user-defined iteration threshold has been reached. Each time the extraction procedure is performed on a record, the number of iterations increases by one. If the iteration threshold has not been reached, the record is still available for extraction, and the procedure moves to step 534.

If all records have been analyzed on the pull list, or the user-defined iteration threshold has been reached, the extraction procedure ends at step 558.

Figure 6:
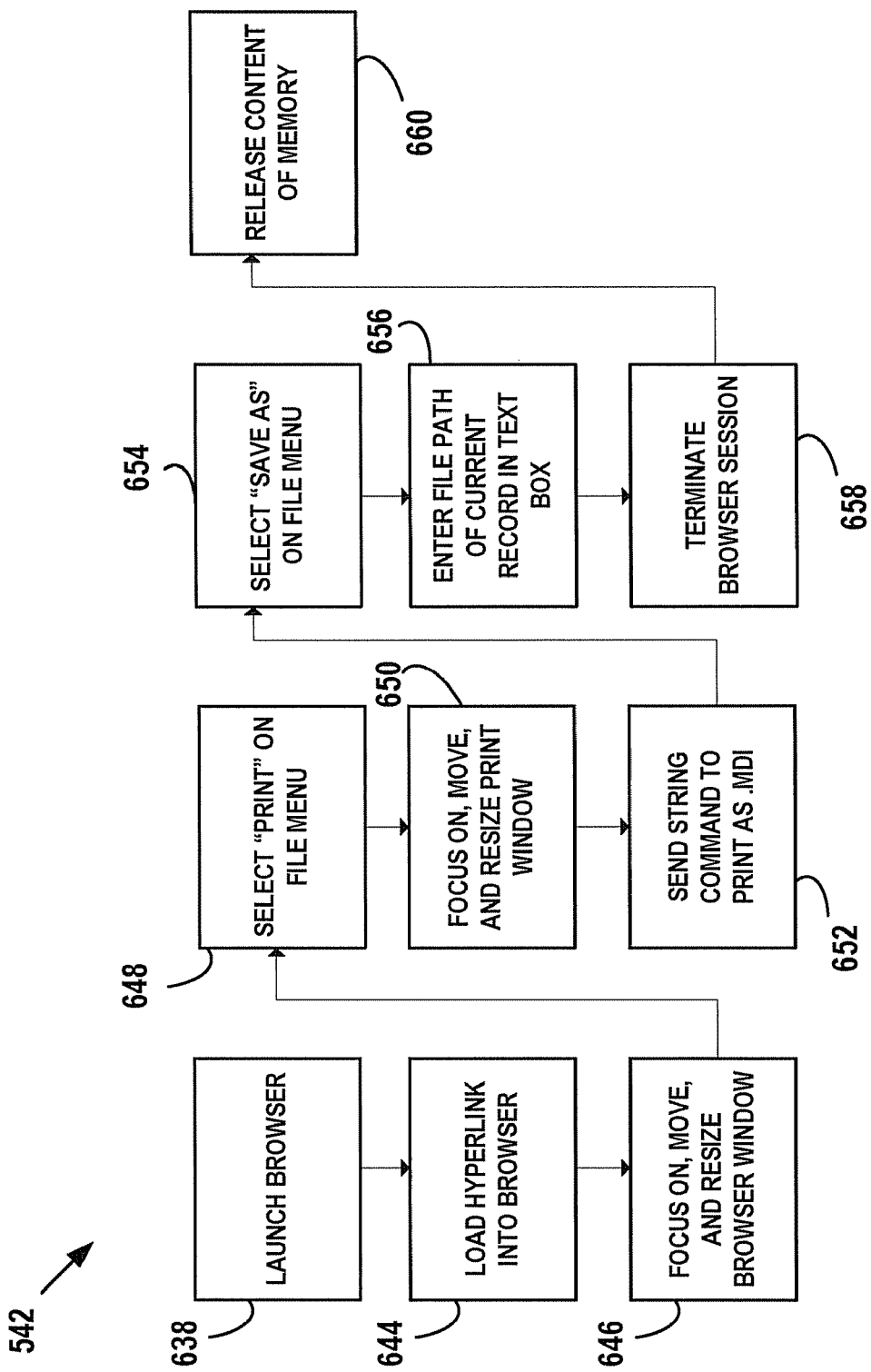
FIG. 6 is a flowchart illustration of a method of operation of an exemplary embodiment of the present invention.

Referring now to FIG. 6, a flowchart of an exemplary extraction procedure step 546 of the extraction module 22 is illustratively shown in accordance with an exemplary embodiment.

Beginning at step 638, and ending at step 660, the application extraction step 637 is performed to extract data from one of the documents 16 in the data warehouse 14 and store the extracted document in a file in the extraction directory. This extraction procedure may vary depending on the record format, host computer, network speed, screen resolution, and data location and format. In an exemplary embodiment, prior to loading the documents 16 into the data warehouse 14, inconsistencies in the documents 16 are identified and resolved.

In an exemplary embodiment, at the step 638, an internet browser software program is launched. This internet browser software may be Microsoft Internet Explorer. In an exemplary embodiment, at step 644, a hyperlink to the document associated with the current record is loaded into the browser. In an exemplary embodiment, at step 646, the internet browser is focused on, moved, and/or resized according the requirements of the operator. In an exemplary embodiment, at step 648, the command "Print" is selected from the drop-down file menu of the browser, causing a print pop-up window to appear. In an exemplary embodiment, at step 650, the print pop-up window is focused on, moved, and/or resized according the requirements of the operator. In an exemplary embodiment, at step 652, a string command is sent to the print pop-up window to print the document as a file with the file name extension "MDI".

In an exemplary embodiment, at step 654, the command "Save As" is selected from the drop-down file menu of the browser, causing a save as pop-up window to appear. In other exemplary embodiments, at step 654, the commands "open," "save," "print," "send," "export," "cut", and "copy" may be selected from the drop-down file menu of the browser. In an exemplary embodiment, at step 656, the file path listed in the current record is entered into a text box on the save as pop-up window, and the extracted data is saved at the designated location. In other exemplary embodiments, at step 656, the file path listed in the current record is entered into a text box located in another type of pop-up window.

In an exemplary embodiment, at step 658, the browser software is closed or otherwise terminated. In an exemplary embodiment, at step 660, the content of the memory, including the current file path and the engagement specific variables, is cleared from the memory.

Figure 7:
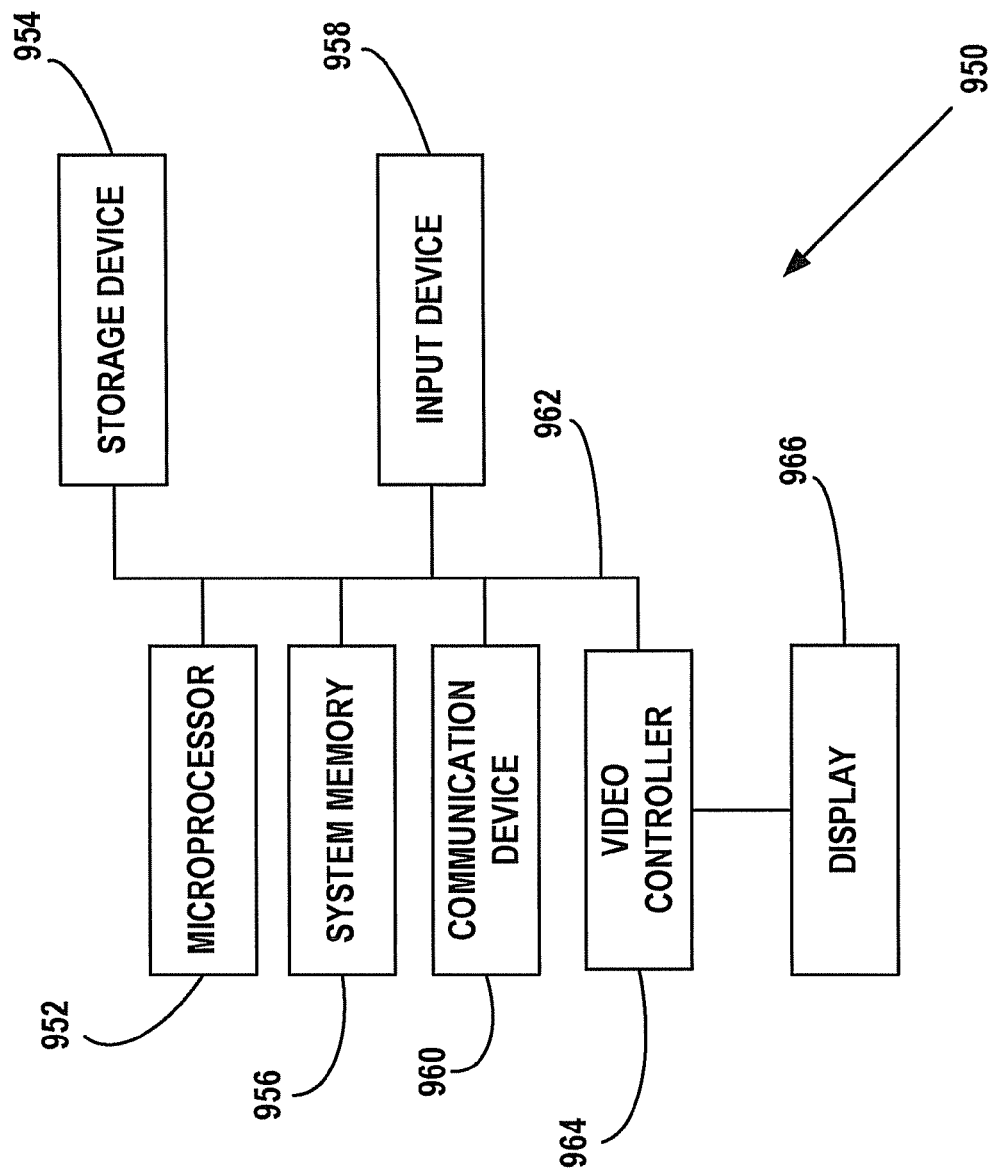
FIG. 7 is a diagrammatic illustration of a node for implementing one or more exemplary embodiments of the present disclosure.

In an exemplary embodiment, as illustrated in FIG. 7, an illustrative node 950 for implementing one or more embodiments of one or more of the above-described networks, elements, methods and/or steps, and/or any combination thereof, is depicted. The node 950 includes a microprocessor 952, an input device 958, a storage device 954, a video controller 964, a system memory 956, a display 966, and a communication device 960 all interconnected by one or more buses 962. In several exemplary embodiments, the storage device 954 may include a floppy drive, hard drive, CD-ROM, optical drive, any other form of storage device and/or any combination thereof. In several exemplary embodiments, the storage device 954 may include, and/or be capable of receiving, a floppy disk, CD-ROM, DVD-ROM, or any other form of computer-readable medium that may contain executable instructions. In several exemplary embodiments, the communication device 960 may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, the system 10 is, or at least includes, the node 950 and/or components thereof, and/or one or more nodes that are substantially similar to the node 950 and/or components thereof.

In several exemplary embodiments, the system 10 typically includes at least hardware capable of executing machine readable instructions, as well as the software for executing acts (typically machine-readable instructions) that produce a desired result. In several exemplary embodiments, system 10 may include hybrids of hardware and software, as well as computer sub-systems. In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, the system 10 includes any machine code stored in any memory medium, such as RAM or ROM, and machine code stored on other devices (such as floppy disks, flash memory, or a CD ROM, for example). In several exemplary embodiments, the system 10 may include source or object code. In several exemplary embodiments, the system 10 encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods. In an exemplary embodiment, the present invention is implemented in software capable or running of a wide-variety of personal and enterprise computer systems.

The present invention can be embodied in a computer program in a computer-readable medium for use in connection with a computer or any other program code execution system. A computer readable medium is any device that stores or communicates a computer program for use by a program code execution system.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

A program code execution system suitable for storing and/or executing program code may include a processor in communication with memory through a bus. Memory may include memory employed during actual execution of the program code, bulk (hard drive) storage, and cache memory to provide temporary storage of some portion or all of program code. Input/output devices (such as keyboards, mice, touch displays, etc.) may be coupled to the program code execution system to enable the operator to interact with the computer program.

In several exemplary embodiments, the database warehouse 14 may based on any standard or proprietary database software, such as Oracle, Microsoft Access, SyBase, or DBase II, for example. In several exemplary embodiments, the database warehouse 14 may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database warehouse 14 is not limiting, and the database may be distributed. In an exemplary embodiment, the database warehouse 14 may exist remotely from the modules, and run on a separate platform. In an exemplary embodiment, the database warehouse 14 may be accessible across the Internet. In several exemplary embodiments, more than one database warehouse may be implemented.

Network adapters may also be coupled to the program code execution system to join the document extraction system with other data processing systems, remote printers or storage devices over digital networks. Examples of network adapters include modems and network cards.

In one embodiment, the present invention comprises: generating a list of file names; for each file name in the list of file names, reading the file name into memory; reading a file that corresponds to the file name into memory; attempting to extract a data element from the file by executing a series of programming instructions, wherein the instructions manipulate a graphical user interface displayed on a display; if the data element is extracted, saving the data element to an extracted file, wherein each data element is saved to a separate extracted file; and identifying one or more file names in the list that correspond to an extracted file.

In another embodiment, the present invention comprises: an apparatus comprising a computer-readable physical medium containing a plurality of instructions executable on a computer, wherein the plurality of instructions comprise: instructions that generate a list of file names; for each file name in the list of file names, instructions that read the file name into memory; instructions that read a file that corresponds to the file name into memory; instructions that attempt to extract a data element from the file by executing a series of programming instructions, wherein the instructions manipulate a graphical user interface displayed on a display; if the data element is extracted, instructions that save the data element to an extracted file, wherein each data element is saved to a separate extracted file; and instructions that identify one or more file names in the list that correspond to an extracted file.

In another embodiment, the present invention comprises: A system comprising: means for generating a list of file names; for each file name in the list of file names, means for reading the file name into memory; means for reading a file that corresponds to the file name into memory; means for attempting to extract a data element from the file by executing a series of programming instructions, wherein the series of programming instructions comprises a means for manipulating a graphical user interface displayed on a display; if the data element is extracted, means for saving the data element to an extracted file, wherein each data element is saved to a separate extracted file; and means for identifying one or more file names in the list that correspond to an extracted file.

We claim:

1. A method for the automated extraction of targeted electronic data from a data warehouse, the method comprising:
    creating a master list of records according to defined criteria for the targeted electronic data;
    generating a pull list of target file names by removing invalid file names from the master list of records, each file name corresponding to an element of the targeted electronic data;
    for each file name in the pull list of file names,
    reading the file name into memory;
    accessing a file that corresponds to the file name by reading the file into memory;
    attempting to extract a data element from the file by executing a series of computer programming instructions, wherein the computer programming instructions act to manipulate a graphical user interface displayed on a display;
    saving the extracted data element to a new file, wherein each extracted data element is saved to a separate new file; and
    creating a list of found file names that correspond to each new file having an extracted data element.

2. The method of claim 1 wherein the extracting a data element from the file by executing a series of programming instructions further comprises executing a series of programming instructions to manipulate an extraction application without user input to extraction application.

3. The method of claim 2 wherein the series of programming instructions to manipulate an extraction application without user interaction comprises:
    causing an internet browser software program to execute;
    loading a hyperlink associated with the file;
    manipulating the graphical user interface to select a command from a menu of the browser; and
    sending an instruction to the internet browser software program.

4. The method of claim 3 wherein the sending an instruction to the Internet browser software program sends an instruction selected from a group consisting of save, save as, print, send, export, cut and copy.

5. The method of claim 1, further comprising:
    identifying one or more file names in the pull list target file names that do not correspond to a file in the list of found file names; and
    for each file name in the pull list of target file names that do not correspond to a file in the list of found file names,
    reading the file name into memory;
    reading a file that corresponds to the file name into memory; and
    attempting to extract a data element from the file by executing a second series of programming instructions, wherein the second series of programming instructions manipulate a graphical user interface displayed on a display.

6. The method of claim 1 wherein the extracted data element is the entire file.

7. An apparatus for the extraction of targeted electronic data from a data warehouse comprising a computer-readable physical medium containing a plurality of instructions executable on a computer, wherein the plurality of instructions comprise:
    instructions that create a master list of records according to defined criteria for the targeted electronic data;

instructions that generate a pull list of target file names by removing invalid file names from the master list of records;

for each file name in the pull list of target file names, instructions that read the file name into memory;

instructions that read a file that corresponds to the file name into memory;

instructions that attempt to extract a data element from the file by executing a series of computer programming instructions, wherein the computer programming instructions manipulate a graphical user interface displayed on a display;

instructions that save the extracted data element to a new file, wherein each extracted data element is saved to a separate new file; and instructions that create a list of new file names that correspond to each new file having an extracted data element.

8. The apparatus of claim 7 wherein the plurality of computer programming instructions further comprise instructions that manipulate an extraction application without user input to the extraction application.

9. The apparatus of claim 8 wherein the computer programming instructions to manipulate an extraction application without user interaction comprise:
instructions that execute an internet browser software program;
instructions that load a hyperlink associated with the file;
instructions that manipulate the graphical user interface to select a command from a menu of the browser; and
instructions that send an instruction to the internet browser software program.

10. The method of claim 9 wherein the instruction sent to the Internet browser software is selected from a group consisting of save, save as, print, send, export, cut and copy.

11. The apparatus of claim 7, wherein the plurality of computer programming instructions further comprise:
instructions that identify one or more file names in the pull list of target file names that do not correspond to a new file; and
for each file name in the pull list of target file names that do not correspond to a new file, read the file name into memory;
instructions that read a file that corresponds to the file name into memory; and
instructions that extract a data element from the file by executing a second series of programming instructions, wherein the second series of programming instructions manipulate a graphical user interface displayed on a display.

12. The method of claim 7 wherein the extracted data element is the entire file.

13. A system for the extraction of targeted electronic data from a data warehouse comprising:

means for creating a master list of records according to defined criteria for the targeted electronic data;
means for generating a pull list of target file names by removing invalid file names from the master list of records;
for each file name in the pull list of target file names,
means for reading the file name into memory;
means for reading a file that corresponds to the file name into memory;
means for attempting to extract a data element from the file by executing a series of programming instructions, wherein the series of programming instructions comprises a means for manipulating a graphical user interface displayed on a display;
means for saving the extracted data element to a new file, wherein each data element is saved to a separate new file; and
means for identifying one or more file names in the pull list of target files that correspond to one of the new files.

14. The system of claim 13 wherein the means for attempting to extract a data element from the file by executing a series of programming instructions further comprises means for executing a series of programming instructions to manipulate an extraction application without user input to the extraction application.

15. The method of claim 14 wherein the means for executing a series of programming instructions to manipulate an extraction application without user interaction comprises:
means for causing an internet browser software program to execute;
means for loading a hyperlink associated with the file;
means for manipulating the graphical user interface to select a command a menu of the browser; and
means for sending an instruction to the internet browser software program.

16. The method of claim 15 wherein the means for sending an instruction to the interne browser software program sends an instruction selected from a group consisting of save, save as, print, send, export, cut and copy.

17. The system of claim 13, further comprising;
means for identifying one or more file names in the pull list of target file names that do not correspond to a new file; and
for each file name in the null list of target file names that do not correspond to a new file,
means for reading the file name into memory;
means for reading a file that corresponds to the file name into memory; and
means for extracting a data element from the file by executing a second series of programming instructions.

18. The method of claim 13 wherein the extracted data element is the entire file.

\* \* \* \* \*